United States Patent [19]

Inagaki et al.

[11] Patent Number: 4,733,760

[45] Date of Patent: Mar. 29, 1988

[54] AUTOMOTIVE VEHICLE DRIVE WHEEL SLIPPAGE CONTROL DEVICE DETECTING VEHICLE ROAD SURFACE CONDITION AND MODIFYING WHEEL BRAKING OPERATION ACCORDING THERETO

[75] Inventors: Takafumi Inagaki; Kazumasa Nakamura; Hiroharu Miyazaki, all of Toyota, Japan

[73] Assignee: Toyota Jidosha Kabushiki Kaisha, Japan

[21] Appl. No.: 889,614

[22] Filed: Jul. 28, 1986

[30] Foreign Application Priority Data

Aug. 1, 1985 [JP] Japan .................................. 60-170300

[51] Int. Cl.$^4$ .............................................. B60K 41/20
[52] U.S. Cl. ..................................... 192/3 R; 180/197; 192/1
[58] Field of Search ................... 192/3 R, 1; 180/197; 303/105; 364/426

[56] References Cited

U.S. PATENT DOCUMENTS

| | | | |
|---|---|---|---|
| 3,967,862 | 7/1976 | Hunter et al. ................. | 180/197 X |
| 4,036,536 | 7/1977 | Quon ................................ | 303/105 X |
| 4,094,555 | 6/1978 | Byrne et al. .................... | 303/105 X |
| 4,196,940 | 4/1980 | Jones ............................... | 303/105 |
| 4,392,202 | 7/1983 | Matsuda ........................... | 364/426 |
| 4,545,240 | 10/1985 | Leiber ............................. | 303/105 X |
| 4,648,663 | 3/1987 | Nomura et al. .................... | 303/106 |

*Primary Examiner*—Rodney H. Bonck
*Attorney, Agent, or Firm*—Parkhurst & Oliff

[57] ABSTRACT

An automotive vehicle driven wheel slippage control device is arranged such that the rotational speed of a driven vehicle wheel is determined. The presence of a condition of acceleration slippage is determined by utilizing as a parameter the rotational speed of the driven wheel. The value of a parameter representing the condition of the road surface on which the vehicle is being operated is determined. A braking device provided to the driven wheel is operated and controlled to set braking conditions for the driven wheel when acceleration slippage is determined, the braking conditions being varied according to the current value of the parameter representing road surface condition. The intensity of braking for the driven wheel may be varied, or, alternatively, the time period of braking therefor may be varied. Optionally, the parameter representing road surface condition may be determined from a value representing torque on the driven wheel and a value representing rotational acceleration thereof.

7 Claims, 11 Drawing Figures

AUTOMOTIVE VEHICLE DRIVE WHEEL SLIPPAGE CONTROL DEVICE DETECTING VEHICLE ROAD SURFACE CONDITION AND MODIFYING WHEEL BRAKING OPERATION ACCORDING THERETO

BACKGROUND OF THE INVENTION

The present invention relates to a drive wheel slippage control device for an automotive vehicle, and more particularly relates to such a drive wheel slippage control device, which controls the braking system of an automotive vehicle during vehicle acceleration in order to prevent acceleration slippage of the drive wheels thereof.

In the prior art there is a known type of drive wheel slippage control device for an automotive vehicle, which detects when, during acceleration of the vehicle, one or more of the vehicle drive wheels is slipping, i.e. is spinning substantially faster than appropriate for the current value of vehicle speed, and which in such circumstances operates a brake device on said slipping drive wheel so as to curb said slippage thereof. In principle, this is effective for preventing excessive tire wear and for enhancing safe vehicle operation, but some problems arise with such a simple form of prior art vehicle drive wheel slippage control.

Namely, in such a prior art vehicle drive wheel slippage control device, regardless of the degree of brake pedal depression, hydraulic pressure or the like is provided for operating the braking system for one or more of the vehicle wheels, so as to stop the excessive spinning of the one of said vehicle drive wheels which is currently slipping. Thus, the acceleration slippage control response may be good. For example, referring to the synchronized graphs of FIG. 2 in which time is shown along the horizontal axis and drive wheel rotational speed and also brake actuating hydraulic fluid pressure are shown along the vertical axes, it may be practiced to decide that acceleration slippage is occurring when the rotational speed Vr of the drive wheel is greater than a determinate rotational speed Vs which is based upon the vehicle road speed Vf, or alternatively when the acceleration of the rotation of said drive wheel is greater than some determinate value; in either case, it is conventional to then operate the braking system for said drive wheel uniformly regardless of the actual currently prevailing road surface conditions, so as to prevent the further slippage of said drive wheel. However, this ignoring of the current road surface conditions, i.e. of the coefficient of friction between the vehicle drive wheels and the road surface, means that satisfactory slippage control is difficult or virtually impossible to obtain, and the problem of reduced vehicle accelerability occurs.

Specifically, when the road surface is dry and has no moisture or ice upon it, then the coefficient of friction between the vehicle drive wheels and the road surface is relatively high, and vehicle drive wheel slippage is difficult. If in these circumstances drive wheel slippage nevertheless does occur, then it is likely that a relatively high braking force on the relevant drive wheel will be needed to control such slippage, and that this relatively high braking force will be needed to be applied for a relatively long time period before drive wheel slippage is fully curbed. On the other hand, when the road surface is wet or icy and has moisture or ice upon it, then the coefficient of friction between the vehicle drive wheels and the road surface is relatively low, and vehicle drive wheel slippage is relatively easy to occur. If in these circumstances drive wheel slippage does in fact occur, then it is likely that only a relatively low braking force on the relevant drive wheel will be needed to control such slippage, and that this relatively low braking force will only be needed to be applied for a relatively short time period before drive wheel slippage is fully curbed. However, since in the conventional art the braking force applied to the slipping drive wheel is substantially uniform regardless of road surface conditions, and since such braking force, when vehicle drive wheel slippage occurs, is applied fo a substantially uniform time period again regardless of road surface conditions, thereby the dilemma arises that: if such braking force and the time for its application are adjusted so as to correspond to a road surface of relatively high coefficient of friction (relative to the vehicle drive wheels), then in the case of a road surface of relatively low such coefficient of friction the amount and the time of braking of a slipping vehicle drive wheel will be excessive, resulting in bad vehicle accelerability; while, on the other hand, if such braking force and the time for its application are adjusted so as to correspond to a road surface of relatively low coefficient of friction (relative to the vehicle drive wheels), then in the case of a road surface of relatively high such coefficient of friction the amount and the time of braking of a slipping vehicle drive wheel will be too low, resulting in bad curbing of vehicle road wheel slippage and the elapsing of a long time period before a slippage episode is finally prevented. Thus, the conventional art is unsatisfactory.

SUMMARY OF THE INVENTION

Accordingly, it is the primary object of the present invention to provide an automotive vehicle drive wheel slippage control device, which is improved so as to avoid the above disclosed problems.

It is a further object of the present invention to provide such an automotive vehicle drive wheel slippage control device, which alters the amount of braking accorded to a slipping drive wheel for the vehicle according to operational requirements.

It is a further object of the present invention to provide such an automotive vehicle drive wheel slippage control device, which controls vehicle road wheel slippage appropriately in all operational circumstances, without ever substantially over or under braking the rotation of the vehicle drive wheels.

It is a yet further object of the present invention to provide such an automotive vehicle drive wheel slippage control device, which does not unduly affect vehicle accelerability.

It is a yet further object of the present invention to provide such an automotive vehicle drive wheel slippage control device, which nevertheless properly curbs vehicle wheel slippage.

It is a yet further object of the present invention to provide such an automotive vehicle drive wheel slippage control device, which is suitable for operation on road surfaces of varying coefficients of friction, ranging from slippery roads covered with ice, snow, or water to dry roads.

According to the most general aspect of the present invention, these and other objects are attained by an automotive vehicle driven wheel slippage control device, comprising: a means for determining the rotational speed of a driven wheel of said automotive vehicle; a means for determining the presence of a condition of acceleration slippage by utilizing as a parameter the rotational speed of said driven wheel as determined by said determining means therefor; a means for determining the value of a parameter representing the condition of the road surface on which said automotive vehicle is being operated; a means for operating a braking device provided to said driven wheel; and: a means for controlling said braking device operating means and for setting braking conditions for said driven vehicle wheel, when acceleration slippage is determined by said determining means therefor, said braking conditions being varied according to the current value of said parameter representing road surface condition. This braking device operating means control means may optionally and preferably vary according to the current value of said parameter representing road surface condition either the intensity of braking provided by said braking device for said driven wheel, or the time duration of said braking, or both. This automotive vehicle driven wheel slippage control device may desirably further comprise a means for throttling down the engine of said automotive vehicle during acceleration slippage. And, as one preferred possibility, said means for determining the value of said parameter representing the condition of the road surface on which said automotive vehicle is being operated may do so by determining a value representing torque on said driven wheel and a value representing the rotational acceleration of said driven wheel, and by obtaining said parameter value therefrom, optionally by table lookup.

In FIG. 1 of the accompanying drawings, there is shown a schematic block diagram of the present invention as specified above, for convenience of explanation. In this figure, the reference symbol M1 denotes the abovementioned driven wheel of the vehicle which is rolling on the road surface denoted as M6, and M4 represents the braking device for said driven wheel M1. M2 represents the means for determining the rotational speed of said driven wheel M1, while M3 represents the means for determining the presence of the acceleration slippage condition, and M5 is the means for operating the braking device M4. Finally, M7 is the means for detecting the condition of the road surface M6, and M8 is the operating means for the brake device control means M5, which according to the current condition of the road surface M6 alters the braking conditions for said driven vehicle wheel M1.

In more detail, the acceleration slippage determining means M3, for example, may calculate the rotational acceleration of the driven vehicle wheel M1 from successive values of the rotational speed thereof as signaled from the detection means M2 therefor, and may decide, if this rotational acceleration is at least a certain determinate value, that said driven vehicle wheel M1 is currently undergoing acceleration slippage. Alternatively, it is possible for this acceleration slippage determining means M3 to determine the actual value of the speed of the vehicle relative to the road surface M6 by some other means (such a radar) and to calculate the difference between said actual vehicle road speed and the product of the rotational speed of said vehicle driven wheel M1 and its circumference, then determining upon the existence of the acceleration slippage condition if said difference is greater than some determinate value. These acceleration slippage condition detection methods are per se conventionally known.

And the means M5 for operating the braking device M4 operates the braking device M4 when acceleration slippage of the wheel M1 is detected by the means M3 for doing so, thus restricting the rotational speed of the wheel M1 and reducing the acceleration slippage thereof. In practice, this braking device operating mean M5 may produce a hydraulic fluid pressure for operating the braking device M4.

The means M7 for detecting the condition of the road surface M6 determines a value mu representing the current coefficient of friction between the vehicle driven wheel M1 and the road surface M6. This may be done by, for instance, directing a beam of light or electromagnetic radiation of a certain wavelength at the road surface M6 and by detecting the roughness thereof by the intensity level of the reflected radiation, or it may be done, as suggested above, by determining a value representing torque on said driven wheel M1 and a value representing the rotational acceleration of said driven wheel M1, and by obtaining said value mu therefrom, optionally by table lookup.

And the operating means M8 for the brake device control means M5 depends upon the value of the road surface frictional coefficient mu determined by the means M7, and sets either the intensity of braking provided by the braking device M4 for the driven wheel M1, or the time duration of said braking, or both, according to said frictional coefficient mu. This is in order to solve the problems outlined above with regard to conventional prior art devices: when said frictional coefficient mu is low, a relatively small amount of braking is required to counter acceleration slippage, so it is appropriate either to set the intensity of braking low or to set the time of braking short, or both; but, when said frictional coefficient mu is high, a relatively great amount of braking is required to counter such acceleration slippage, so it is appropriate either to set the intensity of braking high or to set the time of braking long, or both. This requirement for a low braking effect in the case of a low road surface frictional coefficient mu, or alternatively a high braking effect in the case of a high road surface frictional coefficient mu, is proved by the equation:

$$I_r \times A_r = -(T_r - mu \times W_r \times R)$$

in which $A_r$ is the rotational acceleration of the driven wheel M1 when the vehicle is braking, $I_r$ is the inertial moment of the portion which rotates with said driven wheel M1, $T_r$ is the braking torque exerted by the braking device M4, mu is the coefficient of friction between said driven wheel M1 and the road surface M6, and $W_r$ is the load on said driven wheel M1 and R is its radius.

In this equation, $I_r$, $W_r$, and R are fixed for any one type of vehicle, so for stable braking control irrespective of road surface conditions with constant $A_r$ (effectively, deceleration) the smaller the value of mu the smaller the required braking torque, and conversely the larger the value of mu the larger the required braking torque. Therefore, since the braking torque $T_r$ is proportional to the braking amount or the time of operation of the braking device M4, it is desirable and proper to set braking intensity or the time of operation of the braking device M4 according to the road conditions.

Thus, it is seen that according to the present invention the braking intensity or the time period of braking is set according to the condition of the road surface. Therefore, the braking force is made to depend upon the road surface condition, and stable braking control is obtained upon all types of road surface and in all operational conditions, and good anti acceleration slippage control is provided. In other words, the amount of braking accorded to a slipping drive wheel for the vehicle is altered according to operational requirements, and vehicle road wheel slippage is controlled appropriately in all operational circumstances, without ever substantially over or under braking the rotation of the vehicle drive wheels, and without unduly affecting vehicle accelerability. And, according to this automotive vehicle drive wheel slippage control device, nevertheless vehicle wheel slippage is properly curbed. Further, this automotive vehicle drive wheel slippage control device is suitable for providing good vehicle operation on road surfaces of varying coefficients of friction, ranging from slippery roads covered with ice, snow, or water to dry roads.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; and:

DESCRIPTION OF THE PREFERRED EMBODIMENT

Figure 1:
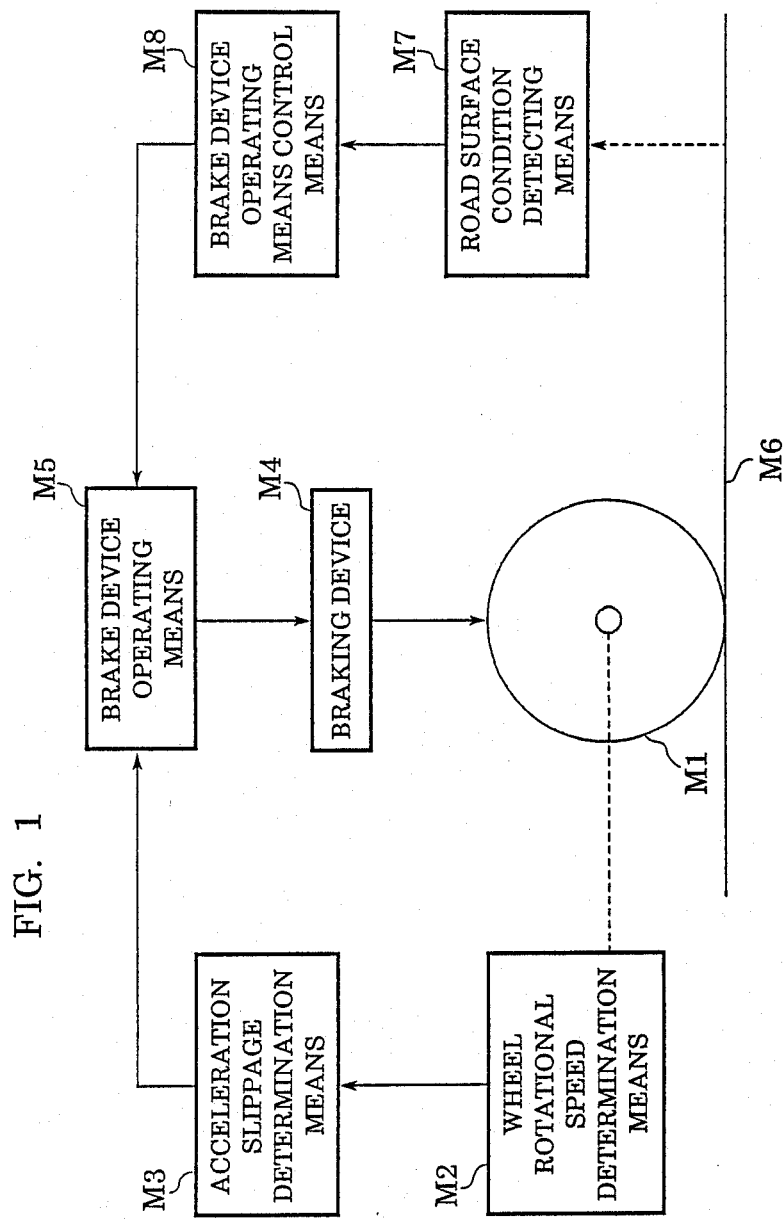
FIG. 1 is a schematic block diagram showing the overall structural concept of the present invention.
Figure 2:
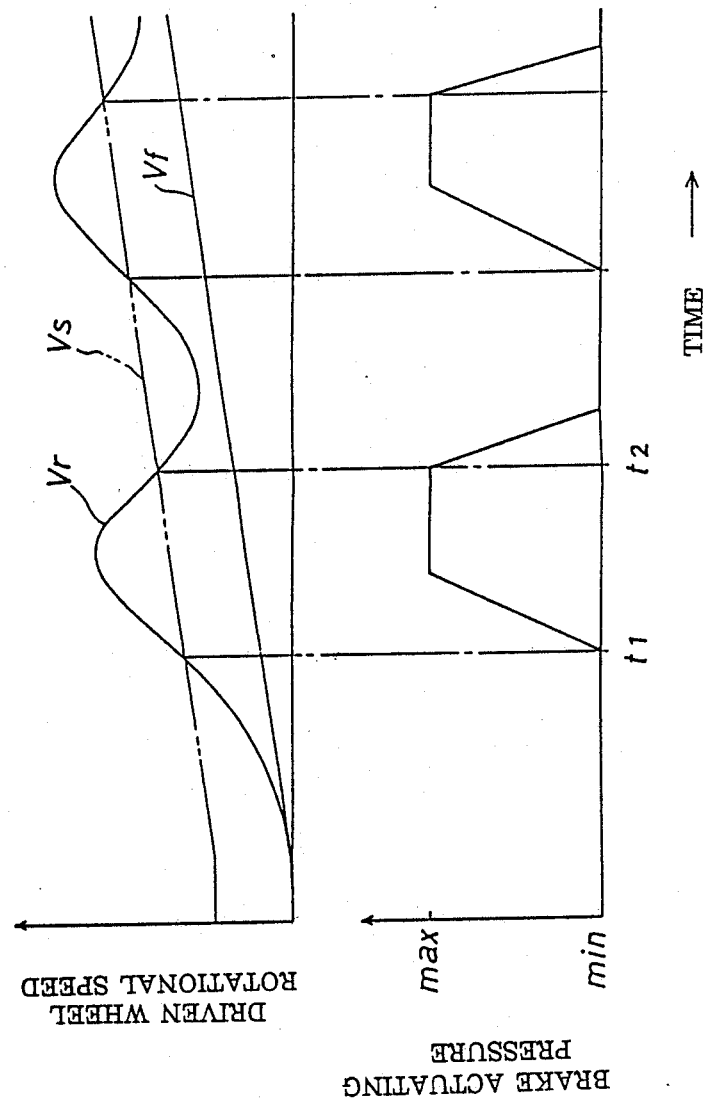
FIG. 2 is a pair of synchronized graphs, in which time is shown along the horizontal axis and vehicle drive wheel rotational speed and brake actuating hydraulic fluid pressure are shown along the vertical axes.
Figure 3:
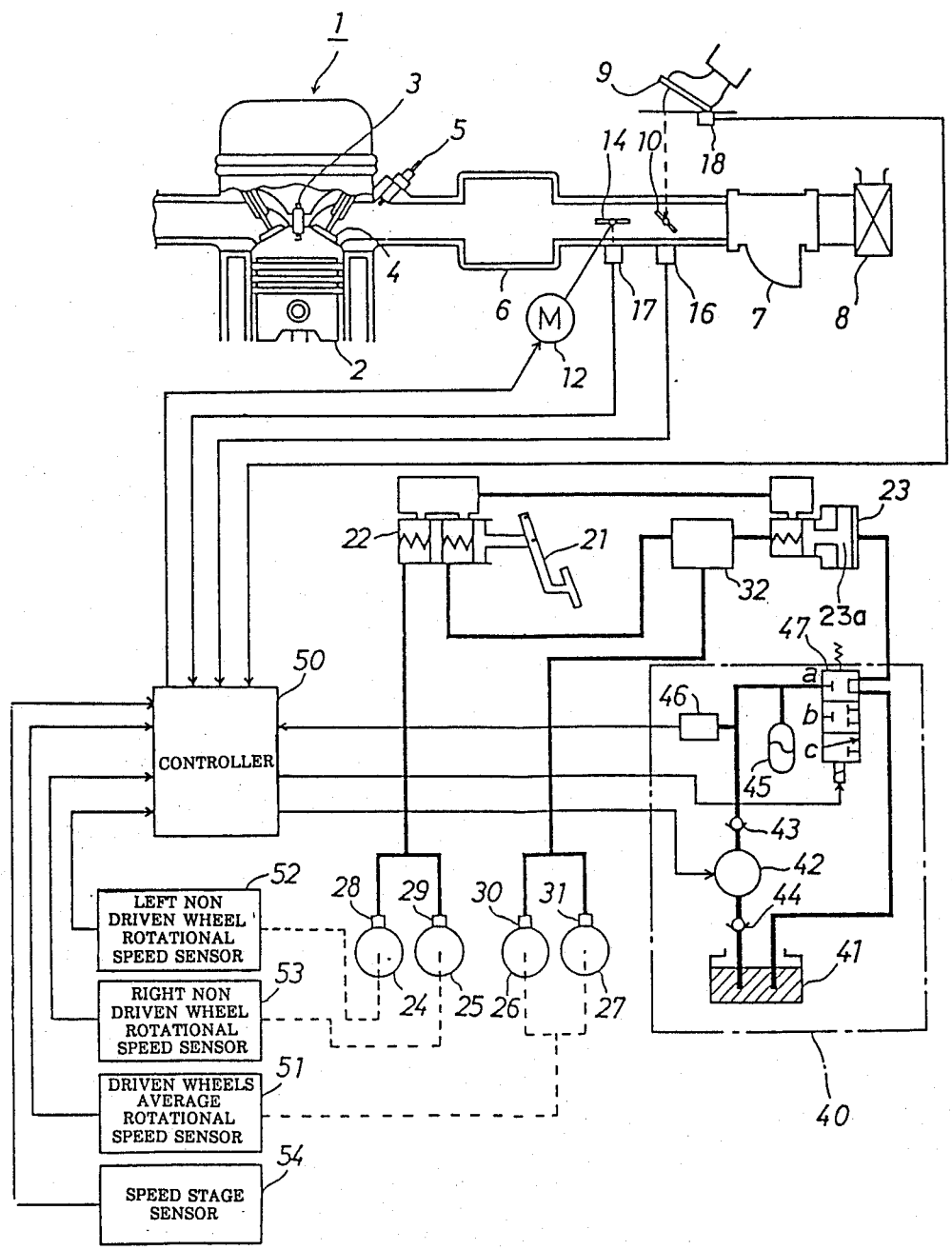
FIG. 3 is a partial schematic view showing relevant parts of an automotive vehicle to which the preferred embodiment of the drive wheel slippage control device of the present invention is fitted, also showing parts of said preferred embodiment.

The present invention will now be described with reference to the preferred embodiment thereof, and with reference to the figures. FIG. 3 shows a partial schematic view of relevant parts of an automotive vehicle, to the braking system of which there is equipped the preferred embodiment of the drive wheel slippage control device of the present invention. In this figure, the reference numeral 1 denotes as a whole the engine of the vehicle, and this engine has a cylinder bore in which there is slidingly and reciprocatingly fitted a piston 2, which in combination with a cylinder head and said cylinder bore defines a combustion chamber in a conventional and per se known manner. This combustion chamber is equipped with a spark plug 3, and its intake of air - fuel mixture is regulated and controlled by an intake valve 4. This air - fuel mixture is sucked in by the combustion chamber from an intake port which includes a fuel injector 5, and an intake passage including a surge tank 6 is connected to supply air to said intake port. Upstream of said surge tank 6 in said intake passage there are provided an air flow meter 7 and an air cleaner 8; and in the intake passage between the air flow meter 7 and the surge tank 6 there is provided a main throttle valve 10 of a butterfly valve type which controls the amount of air sucked in through this engine air intake system. This main throttle valve 10 is connected via a per se conventional linkage (only diagrammatically shown) to the accelerator pedal 9 of the vehicle, so that the more said accelerator pedal is depressed by the foot of the vehicle driver, the more is said main throttle valve 10 opened. And in the intake passage, just downstream of said main throttle valve 10 and between it and the surge tank 6, there is provided a auxiliary throttle valve 14, also of a butterfly valve type, which is controlled by a DC stepper motor 12 (or other electric motor) and which controls the air flow through the air intake system in the same way as does said main throttle valve 10. The angular positions of this main throttle valve 10 and this auxiliary throttle valve 14 are sensed by respective throttle valve position sensors 16 and 17, which produce electrical output signals representative of said throttle valve angular positions; and also the position or amount of depression of the accelerator pedal 9 of the vehicle is sensed by an accelerator pedal position sensor 18, which likewise outputs an electrical signal representative of said accelerator pedal position. The output signals of the main throttle valve sensor 16, the auxiliary throttle valve sensor 17, and the accelerator pedal position sensor 18 are all dispatched to a controller 50 which will be described in detail hereinafter; this controller 50 also controls the stepper motor 12 to position the auxiliary throttle valve 14.

Now the braking system for the vehicle will be described. A brake pedal 21 is connected to a main brake master cylinder 22 which generates pressure according to the amount of depression of said brake pedal 21 by the foot of the driver of the vehicle, and an auxiliary master cylinder 23, which is hydraulically and automatically driven as will be explained shortly, is provided for providing brake hydraulic fluid pressure when acceleration slippage occurs. This vehicle is presumed to have two non driven wheels or free running wheels, schematically shown as 24 and 25 (24 is the left one of said non driven wheels and 25 is the right one), and two driven wheels, schematically shown as 26 and 27; it is immaterial for the purposes of this patent application which of these two pairs of wheels is the pair of front wheels and which is the pair of rear wheels. And the non driven wheels 24 and 25 are equipped with respective brake slave cylinders 28 and 29, and similarly the driven wheels 26 and 27 are equipped with respective brake slave cylinders 30 and 31.

In more detail, the main brake master cylinder 22 is a manually driven tandem type master cylinder apparatus, which is actuated by the foot of the driver of the vehicle, and which based upon the pressure thus exerted on it by said foot supplies a corresponding brake hydraulic fluid pressure through two independent conduit systems, one of said conduit systems supplying actuating pressure to the two brake slave cylinders 28 and 29 for the non driven vehicle wheels 24 and 25, and the other of said conduit systems supplying actuating pressure to the two brake slave cylinders 30 and 31 for the driven vehicle wheels 26 and 27. On the other hand, the auxiliary brake master cylinder 23 is a single type master cylinder apparatus, which is hydraulically actuated by the supply of hydraulic fluid pressure to a pressure chamber 23a incorporated in it, and which according to the magnitude of said supplied actuating hydraulic fluid pressure supplies brake hydraulic fluid pressure only to said conduit system which is for supplying actuating pressure to the two brake slave cylinders 30 and 31 for the driven vehicle wheels 26 and 27. A per se known shuttle valve 32 is provided for feeding, to said conduit system for supplying actuating pressure to said two brake slave cylinders 30 and 31 for said driven vehicle wheels 26 and 27, the one which is higher of the pressure provided by that side of the main brake master cylinder 22 which is for said two brake slave cylinders 30 and 31 for the driven vehicle wheels 26 and 27 and the pressure provided by the auxiliary brake master cylinder 23, while intercepting the one which is lower of said pressures.

The reference numeral 40 denotes an electrically controlled hydraulic control system for thus supplying actuating hydraulic fluid pressure to the pressure chamber 23a of this auxiliary brake master cylinder 23. This hydraulic control system 40, according to the value of an electrical signal supplied to it as will be explained shortly, either (a) drains hydraulic fluid pressure from said pressure chamber 23a of said auxiliary brake master cylinder 23; or (b) locks in any actuating fluid pressure which currently may be in said pressure chamber 23a of said auxiliary brake master cylinder 23, but does not refresh or drain said actuating fluid pressure; or (c) provides high actuating fluid pressure for said pressure chamber 23a of said auxiliary brake master cylinder 23.

In detail, the hydraulic control system 40 comprises a sump 41, a hydraulic fluid pump 42 which picks up hydraulic fluid from said sump 41 and pressurizes it to a pressure value, according to an electrical actuation and control signal which said pump 42 receives; non reverse valves 43 and 44 provided at the input side and the output side of said pump 42 for preventing the reverse flow of pressurized hydraulic fluid, connected as a branch conduit from the output of said pump 42; an accumulator 45 for storing up and accumulating an appropriate quantity of pressurized hydraulic fluid; a hydraulic pressure switch 46 which functions as a detector and which outputs an electrical signal indicative of the pressure value of the hydraulic fluid pressure in the conduit leading out from the pump 42 just downstream of the one way valve 43; and an electromagnetic solenoid valve 47 of a three position type, provided with a biasing spring, which is controlled by an electrical signal dispatched to it from the controller 50 to be in one of three shifted positions denoted as "a", "b", and "c", to an input port of which the output pressure from said pump 42 is provided via the one way valve 43. When said electromagnetic solenoid valve 47 is thus electrically controlled to be in its first shifted position denoted as "a", then it isolates the hydraulic fluid pressure at its said input port, and also communicates a one of its output ports which leads to the pressure chamber 23a of the auxiliary brake master cylinder 23 to another one of its output ports which is drained back to the hydraulic fluid sump 41, thus draining hydraulic fluid pressure from said pressure chamber 23a of said auxiliary brake master cylinder 23; when said electromagnetic solenoid valve 47 is thus electrically controlled to be in its second shifted position denoted as "b", then it isolates both its said input port and its said output port which leads to the pressure chamber 23a of the auxiliary brake master cylinder 23, thus locking in any actuating fluid pressure which currently may be in said pressure chamber 23a of said auxiliary brake master cylinder 23, but not refreshing or draining said actuating fluid pressure; and, when said electromagnetic solenoid valve 47 is thus electrically controlled to be in its third shifted position denoted as "c", then it communicates the hydraulic fluid pressure at its said input port to said one of its output ports which leads to the pressure chamber 23a of the auxiliary brake master cylinder 23, thus providing high actuating fluid pressure for said pressure chamber 23a of said auxiliary brake master cylinder 2.

To the two left and right non driven vehicle wheels 24 and 25 there are respectively provided individual left and right rotational speed sensors 52 and 53, each of which outputs an electrical signal representative of the rotational speed of its non driven wheel; while to the two driven vehicle wheels 26 and 27 there is provided a single combined rotational speed sensor 51, which outputs an electrical signal representative of a rotational speed midway between the rotational speeds of said two driven wheels 26 and 27. This combined rotational speed sensor 51 may be in fact provided to the power output shaft of the vehicle transmission (not particularly shown), or to a differential device or the like. And a speed stage sensor 54, provided to said not shown transmission, outputs an electrical signal indicative of which speed stage the transmission (which may be either a manual transmission or an automatic transmission) is currently operating in.

Figure 4:
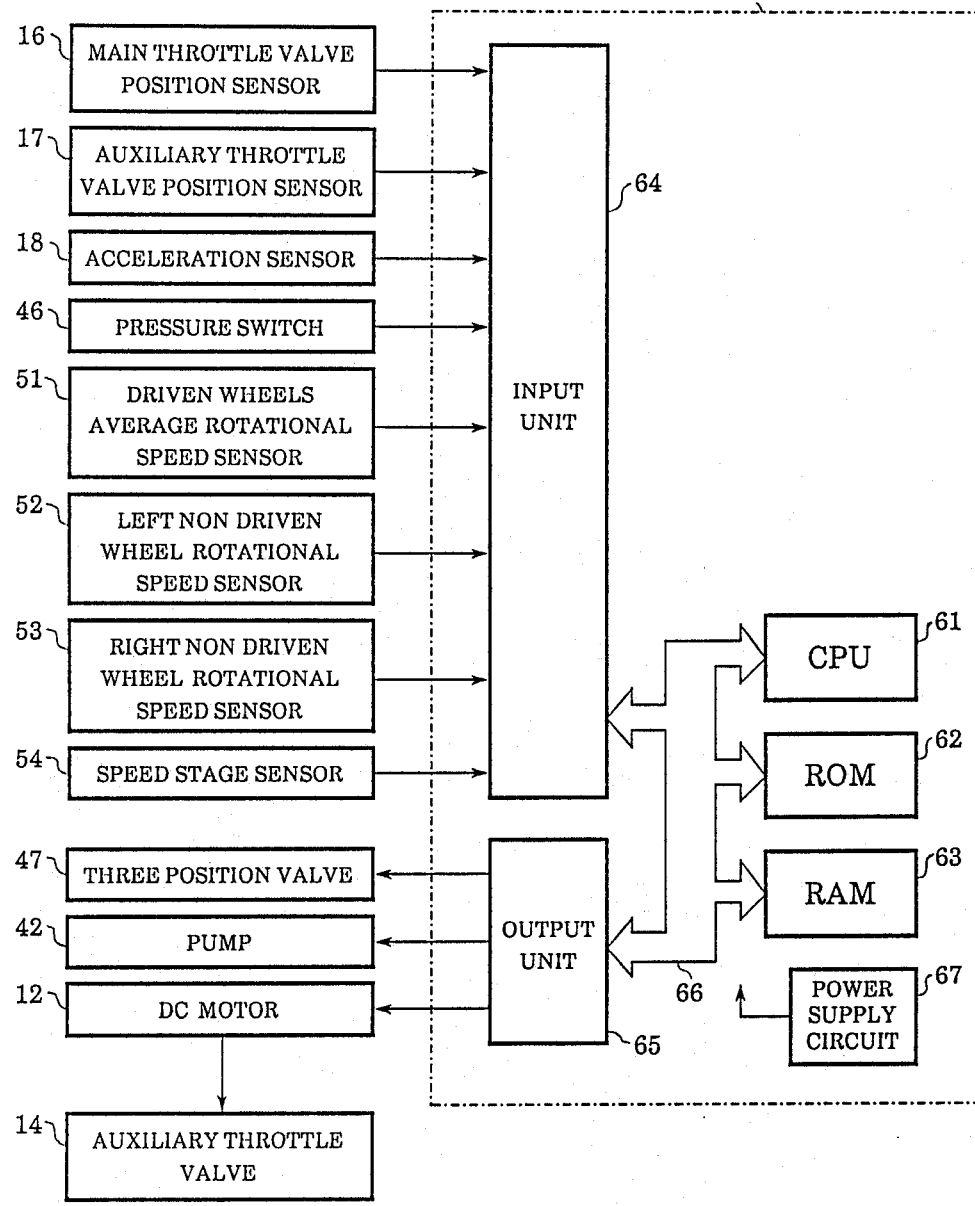
FIG. 4 is a block diagrammatical view of the interior construction of a microcomputer which is incorporated in said preferred embodiment of the present invention.

The controller 50, in this preferred embodiment of the present invention, incorporates a microcomputer and associated input and output circuitry, themselves per se known as regards their construction; henceforward in this specification the assemblage will be referred to merely as "the microcomputer 50". This microcomputer 50 is shown in block diagrammatical view in FIG. 4, and, as partially detailed above, receives electrical input signals and provides electrical output signals as will be described in the following. At its input unit 64, which may include a wave shaper and a multiplexer (neither of these is particularly shown) for selectively obtaining output signals, said microcomputer 50 receives an output signal from the main throttle valve position sensor 16, an output signal from the auxiliary throttle valve position sensor 17, an output signal from the previously described accelerator pedal position sensor 18, an output signal from the pressure switch 46, an output signal from the combined rotational speed sensor 51, output signals from the left and right rotational speed sensors 52 and 53, and an output signal from the speed stage sensor 54. Further, from its output unit 65 which may include various drive circuits or the like not particularly shown, said microcomputer 50 provides output control signals to the three position solenoid valve 47, to the hydraulic fluid pump 42, and to the DC motor 12 for controlling the position of the auxiliary throttle valve 14.

Inside the microcomputer 50, in addition to the just mentioned input unit 64 and output unit 65, there are included a CPU (central processing unit) 61, a ROM (read only memory) 62, a RAM (random access memory) 63, and a bus 66 which interconnects all these components in a per se known manner. And a power supply circuit 67 provides operating power for the microcomputer 50. First to describe in broad outline the function of the microcomputer 50, according to the input values of the signals from the various sensors, it determines when a condition of acceleration slippage is occurring, and appropriately supplies hydraulic braking pressure to the two brake slave cylinders 30 and 31 for the driven vehicle wheels 26 and 27. Also, said microcomputer 50 simultaneously lowers engine power output by appropriately operating the auxiliary throttle valve 14, while thus controlling the rotation of the driven vehicle wheels 26 and 27 by applying braking effect, thus providing acceleration slippage control processing. Further, the microcomputer 50 performs hydraulic fluid pressure control processing by so controlling the hydraulic fluid pressure pump 42 as to maintain an appropriate hydraulic fluid pressure in the accumulator 45. During this microcomputer operation, the ROM 62 stores fixed data such as the control program, data maps, and so on; the RAM 63 stores temporary results needed for the calculation; the bus 66 interconnects the various other parts and conducts signals between them; and the CPU 61 follows the program stored in the ROM 62, performs the various calculations, and generally fulfils the functions of a CPU.

The detailed operation of this microcomputer 50, which implements the present invention, will now be explained with reference to the flow charts and illustrative graphs shown in FIGS. 5 through 11. In the FIG. 5 flow chart, there are shown the processes, as performed by the CPU 61, of obtaining the signals from the various sensors and of determining the presence or absence of the condition of acceleration slippage. Now, the steps of the program fragment expressed by this flow chart will be explained in detail.

In the first decision step 101, a decision is made as to whether or not the vehicle is accelerating, based upon the current value of the output signal received from the accelerator pedal position sensor 18, which outputs an electrical signal representative of the position of the accelerator pedal 19, and which is here assumed to be an ON signal when said accelerator pedal is depressed by more than a determinate value which is taken as indicating vehicle acceleration. If the result of this decision is NO, then no requirement for acceleration slippage control is currently present, and accordingly nothing substantial, except clearing certain flags, need be further done by this program fragment; accordingly, the flow of control is transferred next to the step 102, in which the value of a flag $F_1$ is set to zero, and next to the step 103, in which the value of another flag $F_2$ is set to zero, and lastly to the step 104, in which the value of yet another a flag $F_s$ is set to zero; and then the flow of control passes to next exit this program fragment, without doing anything further.

On the other hand, if the result of the decision step 101 is YES, then acceleration slippage control is currently required to be performed, and accordingly the flow of control passes next to the step 105. In this step 105, the current average rotational speed $V_r$ of the two driven vehicle wheels 26 and 27 (i.e. a value midway between the rotational speeds of said two wheels 26 and 27) is calculated, according to the current value of the output signal from the combined rotational speed sensor 51, and further the current actual vehicle road speed $V_f$ is calculated, according to the current values of the output signals from the individual left and right rotational speed sensors 52 and 53 provided to the two left and right non driven vehicle wheels 24 and 25 respectively. These speeds $V_r$ and $V_f$ are naturally expressed in compatible units, such as kilometers per hour, i.e. are corrected according to the diameter of the wheels in question. And then the flow of control passes next to the step 106.

In this step 106, from the actual vehicle road speed $V_f$, there are calculated a first and a second current $V_f$, standard or reference speeds $V_{s1}$ and $V_{s2}$, for determining whether or not acceleration slippage is occurring, by adding determinate values to said current actual vehicle road speed $V_f$. The first current reference speed $V_{s1}$ is less than the second current reference speed $V_{s2}$. And then the flow of control passes next to the step 107.

In this step 107, a decision is made as to whether the current average rotational speed $V_r$ of the two driven vehicle wheels 26 and 27 is greater than the just determined first current reference speed $V_{s1}$, or not. If the answer to this decision is NO, so that $V_r$ is determined not to be greater than $V_{s1}$, then it is deemed that acceleration slippage is not substantially occurring at all at this time, and then the flow of control passes next to the steps 102, 103, and 104 in succession, as described earlier, so as to clear the flags $F_1$, $F_2$, and $F_s$ to zero; and then the flow of control passes to next exit this program fragment, without doing anything further. On the other hand, if the answer to this decision is YES, so that $V_r$ is determined indeed now to be greater than $V_{s1}$, then it is deemed that acceleration slippage is currently occurring to a substantial extent, and in this case the flow of control passes next to the decision step 108.

In this decision step 108, a decision is made as to whether the value of the flag $F_1$ is currently zero, or not. If the answer to this decision is NO, this means that acceleration slippage has already been detected and control thereof has already started and that this is not the first time through this FIG. 5 routine for this acceleration slippage episode, and thus the flow of control skips to be transferred next to the decision step 111. On the other hand, if the answer to this decision is YES, so that this is in fact the first time around the FIG. 5 routine that this episode of acceleration slippage has been detected, then the flow of control is transferred next to the step 109.

Figure 5:
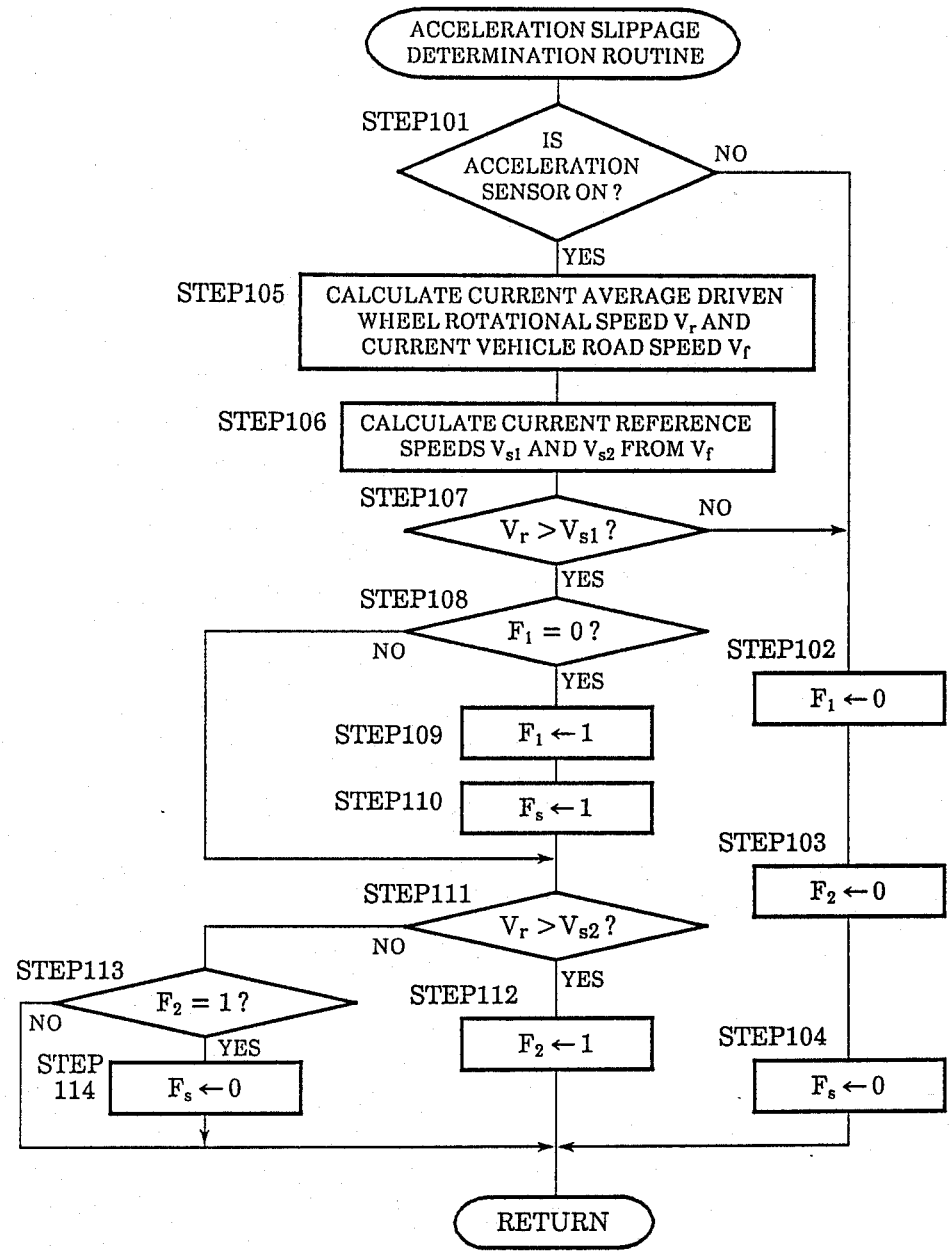
FIG. 5 is a flow chart showing the processes of obtaining signals from various sensors and of determining the presence or absence of the condition of acceleration slippage.

In this step 109, the value of the flag $F_1$ is set to unity, to indicate that now acceleration slippage has been detected and that the next time round this FIG. 5 routine will no longer be the first time for this acceleration slippage episode, and next the flow of control passes to the step 110. In this step 110, the value of the flag $F_s$ is also set to unity. This flag $F_s$ is used in the routine, to be described below, for control of the auxiliary throttle valve 14, and for the braking hydraulic fluid control routine for actually carrying out the acceleration slippage control for actually hindering the rotation of the vehicle driven wheels. Finally the flow of control is transferred next to the decision step 111.

In this step 111, a decision is made as to whether the current average rotational speed $V_r$ of the two driven vehicle wheels 26 and 27 is greater than the previously determined second current reference speed $V_{s2}$, or not. If the answer to this decision is YES, so that $V_r$ is determined indeed now to be greater than $V_{s2}$, then control is transferred to the step 112 in which the value of the flag $F_2$ is set to be unity, and next the flow of control passes to exit this program fragment, without doing anything further. On the other hand, if the answer to this decision is NO, so that $V_r$ is determined not currently to be greater than $V_{s2}$, then the flow of control passes next to the decision step 113.

In this step 113, a decision is made as to whether or not the current value of the flag $F_2$ is unity. This distinguishes between the case that the acceleration slippage has just occurred relatively recently and now the driven wheels 26 and 27 of the vehicle are spinning more and more furiously but their rotational speed although it has risen to be greater than $V_{s1}$ has not yet risen to be greater than $V_{s2}$, and the alternative case that after detection of acceleration slippage the initially relatively fierce rotation of said driven wheels 26 and 27 has been somewhat curtailed, so that the average rotational speed $V_r$ of said driven wheels has dropped somewhat to be now less than $V_{s2}$, after once having risen to be greater than $V_{s2}$. Thus, if the answer to this step 113 decision is YES, so that braking has indeed been done and $V_r$ has indeed now dropped to be lower than $V_{s2}$ again after once in this episode having been greater than $V_{s2}$, then the flow of control passes next to the step 114, in which the value of the flag $F_s$ is set to be zero, and then the flow of control passes to exit this program fragment, without doing anything further. On the other hand, if the answer to this decision is NO, then this is deemed to be the initial stage of acceleration slippage, and in this case the flow of control directly passes to exit this program fragment, without doing anything further.

Thus, to summarize the operation of the FIG. 5 subroutine, as illustrated in the time chart of FIG. 8, when the average driven wheel rotational speed $V_r$ exceeds $V_{s1}$, then the flag $F_s$ is set to unity, and said value of said flag $F_s$ is kept at unity until anti acceleration slippage braking has been performed and has succeeded so as to bring $V_r$ below $V_{s2}$. The acceleration slippage control, i.e. the brake hydraulic fluid pressure control routine and the auxiliary throttle valve control routine described hereinafter, use the value of the flag $F_s$ to determine that the acceleration slippage condition is currently in existence, and as will be described shortly they perform their functions respectively by braking the driven wheels 26 and 27 of the vehicle, and by actuating the auxiliary throttle valve 14.

Figure 6:
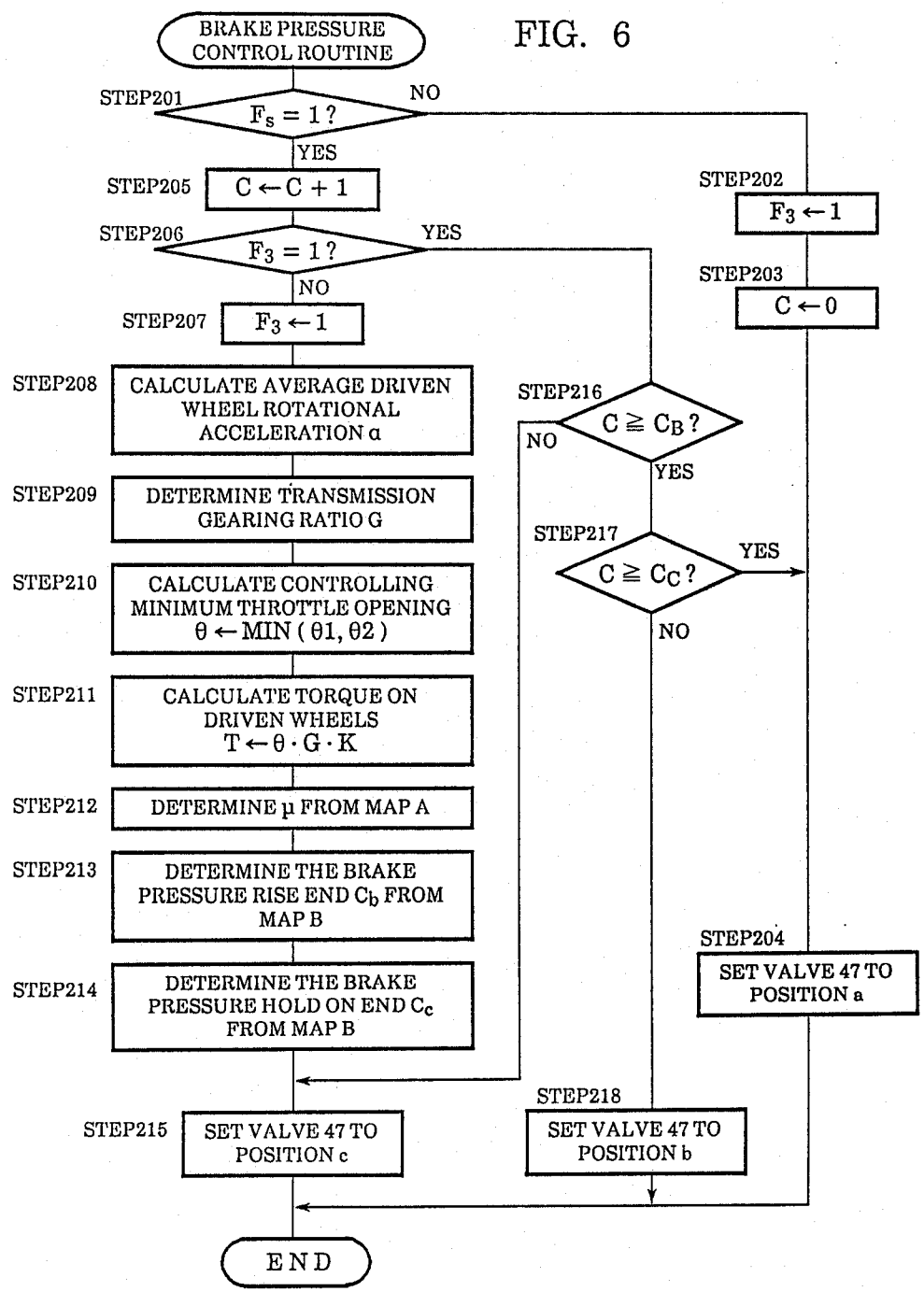
FIG. 6 is a flow chart showing the process of controlling the brake hydraulic fluid pressure supplied to the brake slave cylinders for the driven vehicle wheels, in the case of the presence of the condition of acceleration slippage.

In the FIG. 6 flow chart, there are shown the processes, as performed by the CPU 61, of controlling the brake hydraulic fluid pressure supplied to the two brake slave cylinders 30 and 31 for the driven vehicle wheels 26 and 27, in the case of the presence of the condition of acceleration slippage. The steps of the program fragment expressed by this flow chart will now be explained in detail; this program fragment may be executed once every some fixed time interval, for example about once every twenty milliseconds.

In the first step 201, a decision is made as to whether the value of the flag $F_s$ is currently equal to unity, or not. If the answer to this decision is NO, so that $F_s$ is currently in fact zero, then it is deemed that no acceleration slippage is currently occurring, and then the flow of control passes next to the step 202. On the other hand, if the answer to this decision is YES, so that $F_s$ is currently in fact unity, then it is deemed that acceleration slippage is currently occurring, and in this case the flow of control passes next to the step 205.

In the non acceleration slippage case, in the step 202 the value of a flag $F_3$ is set to zero, and in the next step 203 the value of a counter C is cleared. Next, in the step 204, the microcomputer 50 outputs an appropriate electrical signal to the solenoid (not particularly shown) of the three position solenoid valve 47 to cause said valve 47 to be set to its first shifted position denoted as "a", in which as described above it isolates the hydraulic fluid pressure at its input port and communicates the pressure chamber 23a of the auxiliary brake master cylinder 23 to be drained back to the hydraulic fluid sump 41, thus ensuring that said pressure chamber 23a of said auxiliary brake master cylinder 23 is supplied with substantially zero hydraulic fluid pressure so that the brake slave cylinders 30 and 31 for the driven vehicle wheels 26 and 27 are not supplied with substantial pressure as far as this automatic braking system is concerned; of course, at any time, the vehicle driver may himself or herself apply the brakes, by use of the brake pedal, via the main brake master cylinder 22. Finally, the flow of control passes to leave this program fragment, without doing anything further.

However, in the acceleration slippage case, in the step 205 the value of the counter C is incremented by one, and control is passed to the decision step 206. In this decision step 206, a decision is made as to whether the current value of the flag $F_3$ (set to zero in the step 202 of the other branch from the step 201) is unity, or not. If the answer to this decision is NO, so that this is the first time around this subroutine that this branch from the step 201 has been taken, then it is deemed that no acceleration slippage up to the present has occurred and this is the first time that $F_s$ is unity, and then the flow of control passes next to the step 207. On the other hand, if the answer to this decision is YES, so that this is not the first time and acceleration slippage control has already been initiated, then in this case the flow of control passes next to the decision step 216.

In the case of this being the first time that acceleration slippage is required to be controlled, in the step 207 the value of the flag $F_3$ is set to unity, and then control passes to the step 208. In this step 208, the current value alpha of the average rotational acceleration of the driven wheels 26 and 27 of the vehicle is calculated from the last two values $V_r$ of the average speed of said driven wheels 26 and 27 determined in the last two iterations of the FIG. 5 routine for detecting acceleration slippage, i.e. from $V_{r(n-1)}$ and $V_{r(n-2)}$ and from the time difference delta-t between the times of these last two iterations; and then the flow of control passes next to the step 209.

In this step 209, the gearing ratio G which is currently being provided by the transmission (not shown) of the vehicle is determined, based upon the output signal from the speed stage sensor 54 provided to said transmission, and next the flow of control passes to the step 210. In this step 210, the controlling minimum throttle opening theta is calculated as being the one of theta$_1$ and theta$_2$ which is smaller, theta$_1$ being the current opening amount of the main throttle valve 10 as determined from the current value of the output signal from the throttle valve position sensor 16 for this main throttle valve 10, and theta$_2$ being the current opening amount of the auxiliary throttle valve 14 as determined from the current value of the output signal from the throttle valve position sensor 17 for this auxiliary throttle valve 14; and next the flow of control passes to the step 211.

In this step 211, the torque T which is being applied to the driven wheels 26 and 27 of the vehicle is determined, as being the product of the current controlling minimum throttle opening theta, the current gearing ratio G, and a constant K; and next the flow of control passes to the step 212. In this step 212, the current value of the coefficient of friction between the drive wheels 26 and 27 and the road surface is calculated from a data map such as the data map A exemplarily shown in FIG. 9, which uses the torque T which is being applied to the driven wheels 26 and 27 and the current value alpha of the average rotational acceleration of said driven wheels 26 and 27 as parameters; and next the flow of control passes to the step 213.

Thus, this sequence of steps 208 through 212 for calculating the value of the coefficient of friction between the driven wheels 26 and 27 and the road surface corresponds to the means M7 discussed in the section of this specification entitled "Summary of the Invention". The road surface coefficient of friction is calculated from the driven wheel torque T and the driven wheel average angular acceleration alpha, because if the rotational motion of the drive wheels during acceleration follows equation, with the inertial moment of the portion rotating with the driven wheels being taken as $I_t$, with the average acceleration of said driven wheels 26 and 27 being taken as alpha, and with torque T, load W, tire radius R, and coefficient of friction mu, then:

$$I_t \cdot alpha = T - mu \cdot W \cdot R$$

It, W, and R are constant. In this preferred embodiment of the present invention, T is derived from the controlling minimum throttle opening theta and the gearing ratio G, but of course said torque T could alternatively be determined directly from the rotational torque of the driven wheels, using a rotational torque sensor mounted on the vehicle propeller shaft, or the like.

In the next step 213, there is derived a limit count value $C_b$ for the counter C, which corresponds to the time that will be taken to complete the rise of the brake hydraulic fluid pressure for the slave brake cylinders 30 and 31 for the driven vehicle wheels 26 and 27, according to the value of mu the road surface coefficient of friction found above; $C_b$ is derived from a data map such as the data map B exemplarily shown in FIG. 10, which uses said coefficient of friction mu as a parameter. Thus, this sets $C_b$ in terms of mu, thus as will be seen shortly setting the final value for the brake pressure which is to be transmitted to the driven wheel brake slave cylinders 30 and 31. This step therefore corresponds to the means M8 discussed in the section of this specification entitled "Summary of the Invention". And next the flow of control passes to the step 214.

In this next step 214, similarly there is derived another limit count value $C_c$ for the counter C, which corresponds to the time for which the brake hydraulic fluid pressure in said slave brake cylinders 30 and 31 for said driven vehicle wheels 26 and 27 will be held on, again according to the value of mu the road surface coefficient of friction; $C_c$ may be similarly derived from the data map B exemplarily shown in FIG. 10, using said coefficient of friction mu as a parameter. Thus, this sets $C_c$ and determines the time the brakes are held on in terms of mu. This step therefore also corresponds to the means M8 discussed in "Summary of the Invention". And next the flow of control passes to the step 215.

Next, in the step 215, the microcomputer 50 outputs an appropriate electrical signal to the solenoid (not particularly shown) of the three position solenoid valve 47 to cause said valve 47 to be set to its third shifted position denoted as "c", in which as described previously it communicates the hydraulic fluid pressure at its input port to the one of its output ports which leads to the pressure chamber 23$a$ of the auxiliary brake master cylinder 23, thus providing high actuating fluid pressure for said pressure chamber 23$a$ of said auxiliary brake master cylinder 23 so that the brake slave cylinders 30 and 31 for the driven vehicle wheels 26 and 27 are communicated to supply of substantial pressure as far as this automatic braking system is concerned. Thus, the brakes of said driven vehicle wheels 26 and 27 are applied more and more strongly as time passes and the FIG. 6 program is reiterated with the flow of control repeatedly passing through the program branch including this step 215,. until as will be seen shortly the counted value of the counter C reaches $C_b$. Finally, the flow of control passes to leave this program fragment, without doing anything further.

On the other hand, if in the decision step 206 the answer to the decision as to whether or not the current value of the flag $F_3$ is unity is YES, so that this is not the first time around this subroutine that this branch from the step 201 has been taken, then it is deemed that acceleration slippage control has already been initiated, and in this case the flow of control passes next to the decision step 216. In this decision step 216, a decision is made as to whether the current value of the counter C has yet reached the previously determined count limit value $C_b$, or not. If the answer to this decision is NO, so that this branch of the FIG. 6 routine has not yet been traversed as many as $C_b$ times, then still the braking system for the driven wheels 26 and 27 is not yet applied as much as is required (i.e., has not been applied for as long an application period as is considered to be required to produce the proper degree of brake application in these operational circumstances), and then the flow of control passes next to the step 214, detailed above, which continues to more and more forcibly apply said braking system for said driven wheels 26 and 27 by further supply of hydraulic fluid pressure to the pressure chamber 23a of the auxiliary brake master cylinder 23, thus providing higher and higher actuating fluid pressure for the pressure chamber 23a of the auxiliary brake master cylinder 23, so that the brake slave cylinders 30 and 31 for the driven vehicle wheels 26 and 27 are communicated to supply of more and more substantial pressure. On the other hand, if the answer to this step 216 decision is YES, so that this branch of the FIG. 6 routine has now yet been traversed $C_b$ times, then it is deemed that the braking system for the driven wheels 26 and 27 is now applied as much as required in these operational circumstances, and in this case the flow of control passes next to the decision step 217.

In this step 217, a decision is made as to whether the current value of the counter C has yet reached the previously determined other count limit value $C_c$, or not. If the answer to this decision is NO, so that this branch of the FIG. 6 routine has not yet been traversed as many as $C_c - C_b$ times, then still the braking system for the driven wheels 26 and 27 has not yet been held on in the applied state for as long a time as is required, and then the flow of control passes next to the step 218. In this step 218, the microcomputer 50 outputs an appropriate electrical signal to the solenoid (not particularly shown) of the three position solenoid valve 47 to cause said valve 47 to be set to its second shifted position denoted as "b", in which as described previously it isolates both its pressure receiving input port and its output port which leads to the pressure chamber 23a of the auxiliary brake master cylinder 23, thus locking in the actuating fluid pressure currently in said pressure chamber 23a of said auxiliary brake master cylinder 23, but not particularly refreshing or draining said actuating fluid pressure. And then, again, the flow of control passes to leave this program fragment, without doing anything further.

On the other hand, if the answer to this step 217 decision is YES, so that this branch of the FIG. 6 routine has now been traversed $C_c - C_b$ times, then it is deemed that the braking system for the driven wheels 26 and 27 has now been held on in the applied state for as long a time period as required in these operational circumstances, and in this case the flow of control passes next to the step 204, which, as explained previously, performs the operation of draining, via the three way valve 47, the pressure chamber 23a of the auxiliary brake master cylinder 23, thus completely, positively, and definitely releasing the braking systems for the driven wheels 26 and 27 and ending acceleration slippage control.

Figure 8:
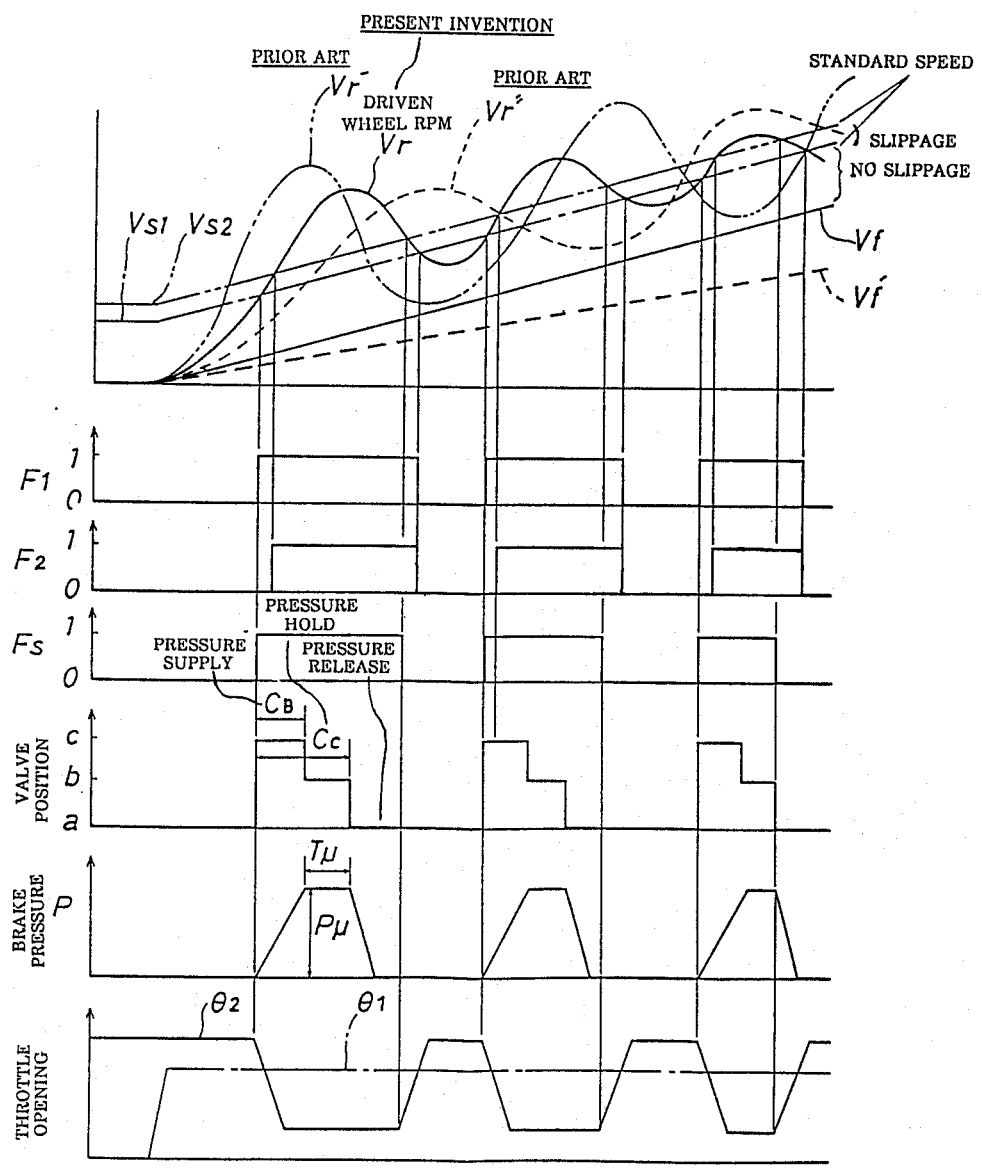
FIG. 8 is a time chart showing the time behavior of average driven wheel rotational speed, of the values of flags $F_1$, $F_2$, and $F_s$, of the position of a control valve, of brake actuating hydraulic fluid pressure, and of throttle opening, during a drive wheel acceleration slippage episode.
Figure 9:
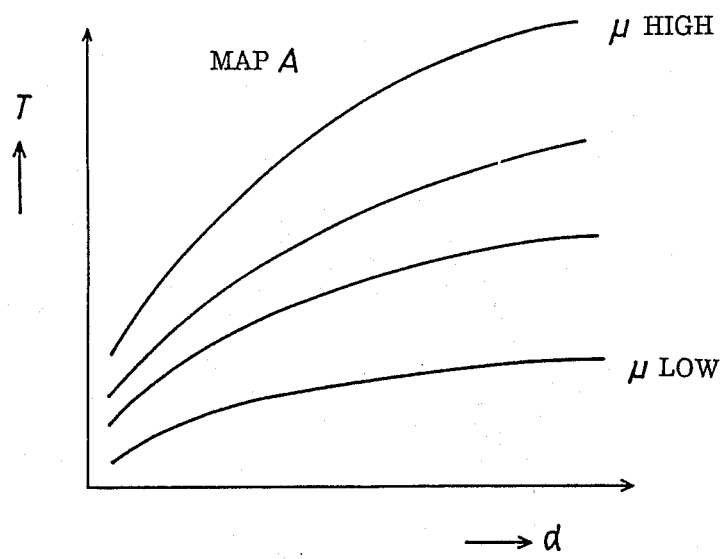
FIG. 9 is an exemplary data map A, showing the way in which the value of the coefficient of friction mu between the vehicle driven wheels and the road surface is determined in the preferred embodiment of the present invention as depending upon the torque applied to said driven wheels and the acceleration of said driven wheels.
Figure 10:
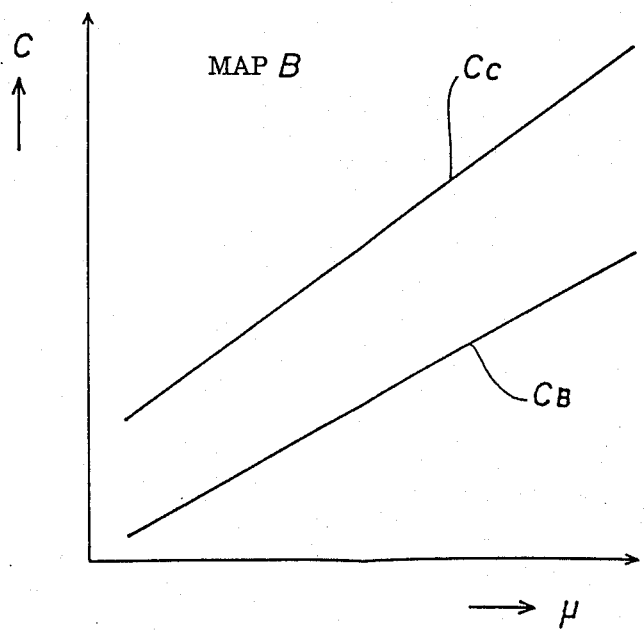
FIG. 10 is an exemplary data map B, showing the way in which a first count limit value $C_b$, which determines the intensity of braking effect provided for the braking system for the driven vehicle wheels, and a second count limit value $C_c$, which determines the length of time that said braking effect is held on for braking said driven vehicle wheels, are determined as based on said coefficient of friction mu between the vehicle driven wheels and the road surface.

Thus, referring again to the time chart of FIG. 8, the hydraulic pressure supplied to the brake cylinders 30 and 31 for the driven wheels 26 and 27 rises to a value $P_{mu}$ (corresponding to the value of the determined count limit $C_b$) which depends upon the coefficient of friction mu between the drive wheels 26 and 27 and the road surface, and then remains at that value $P_{mu}$ for a time $T_{mu}$ (corresponding to the value of the determined count limit $C_c - C_b$) which also depends on said road surface coefficient of friction mu.

Figure 7:
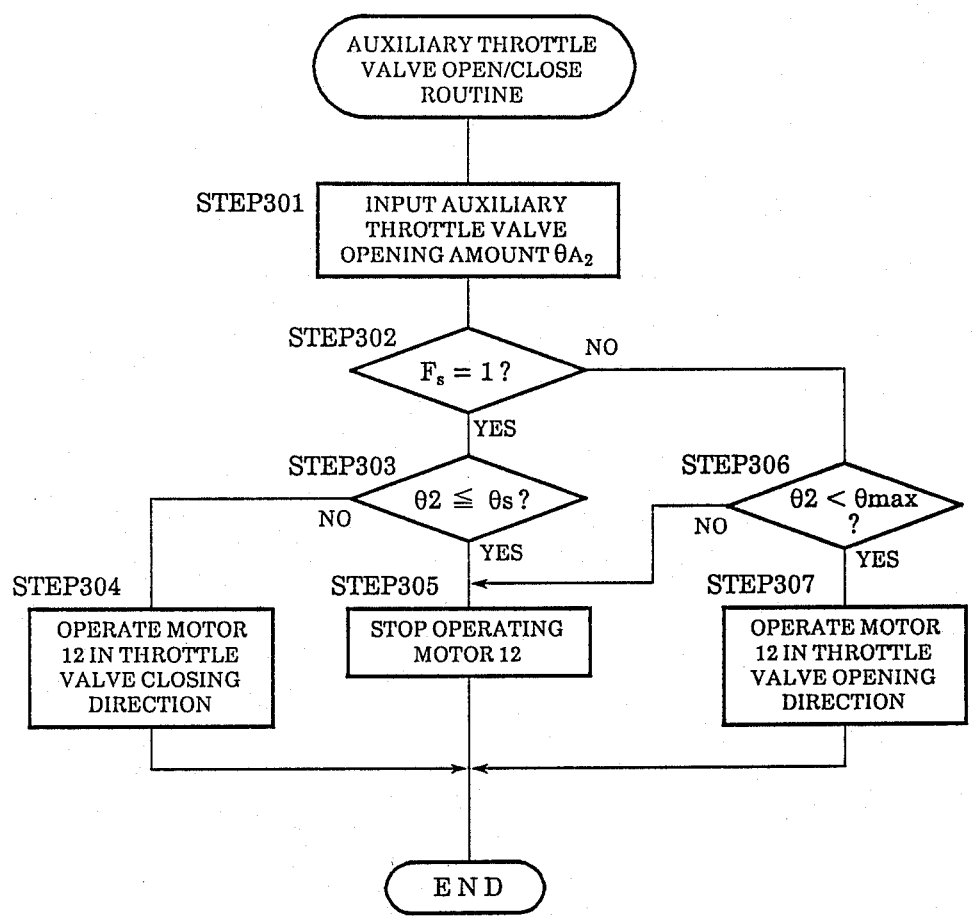
FIG. 7 is a flow chart showing the process of controlling an auxiliary throttle valve, in order to support the braking performed by the FIG. 6 program fragment, also in the case of the presence of the condition of acceleration slippage.

In the FIG. 7 flow chart, there are shown the processes, as performed by the CPU 61, of controlling the auxiliary throttle valve 14, in order to support the braking performed as described above with reference to the FIG. 6 program fragment, also in the case of the presence of the condition of acceleration slippage. The steps of the program fragment expressed by this flow chart will now be explained in detail; this program fragment again may be executed once every some fixed time interval, for example about once every twenty milliseconds. The basic action of this program fragment is to close the auxiliary throttle valve 14 during the above described control of the acceleration slippage condition, and otherwise to open said auxiliary throttle valve 14; thus, quite a simple method of control is practiced.

In the step 301, the angular position or opening amount $theta_2$ of said auxiliary throttle valve 14 is determined, based upon the output signal of the auxiliary throttle valve position sensor 17 therefore, and next the flow of control passes to the decision step 302.

In this step 302, a decision is made as to whether the value of the flag $F_s$ (set in the FIG. 5 routine) is unity, or not. If the answer to this decision is NO, so that the flag $F_s$ is in fact currently equal to zero, then it is deemed that acceleration slippage is not currently occurring and the auxiliary throttle valve 14 should be fully opened, and then the flow of control passes next to the decision step 306. On the other hand, if the answer to this decision is YES, so that the flag $F_s$ is in fact currently equal to unity, then it is deemed that at this time acceleration slippage is occurring and control of the opening amount of the auxiliary throttle valve 14 is required, and in this case the flow of control passes next to the decision step 303.

In this decision step 303, a decision is made as to whether the current value of this angular position or opening amount $theta_2$ of said auxiliary throttle valve 14 is less than or equal to a determinate value $theta_s$, or not. If the answer to this decision is NO, so that $theta_2$ is greater than $theta_s$, then it is deemed that the opening amount of the auxiliary throttle valve 14 is too great, and then the flow of control passes next to the step 304. On the other hand, if the answer to this decision is YES, so that $theta_2$ is less than or equal to $theta_s$, then it is deemed that the opening amount of the auxiliary throttle valve 14 is satisfactorily low, and in this case the flow of control passes next to the step 305.

On the other hand, in the decision step 306, a decision is made as to whether the current value of this angular position or opening amount $theta_2$ of said auxiliary throttle valve 14 is less than the maximum value $theta_{max}$ therefore, or not. If the answer to this decision is NO, so that $theta_2$ is (substantially) equal to $theta_{max}$, then the opening amount of the auxiliary throttle valve 14 is of course now sufficient, and then the flow of control passes next to the step 305. On the other hand, if the answer to this decision is YES, so that $theta_2$ is less than $theta_{max}$, then it is deemed that the opening amount of the auxiliary throttle valve 14 is too low at this time, and in this case the flow of control passes next to the step 307.

Now, in the step 304, the microcomputer 50 operates the DC stepper motor 12 in such a manner as to drive the auxiliary throttle valve 14 in the closing direction, as is an appropriate action for this stage in the program; and next the flow of control passes to leave this program fragment, without doing anything further. On the other hand, in the step 305, the microcomputer 50 ceases operating the DC stepper motor 12 so as to cease driving the auxiliary throttle valve 14, as will likewise be seen to be an appropriate action for this stage in the program; and similarly next the flow of control passes to leave this program fragment, without doing anything further. Finally, in the step 307, the microcomputer 50 operates the DC stepper motor 12 in such a manner as to drive the auxiliary throttle valve 14 in the opening direction, as also is an appropriate action for this stage in the program; and yet again next the flow of control passes to leave this program fragment, without doing anything further.

Thus, if acceleration slippage is not in fact currently occurring, then the DC stepper motor 12 is operated in such a manner as to drive the auxiliary throttle valve 14 in the opening direction until it is approximately fully open to the angle $theta_{max}$. On the other hand, if acceleration slippage is in fact currently occurring, then the DC stepper motor 12 is operated in such a manner as to drive said auxiliary throttle valve 14 in the closing direction until it is closed approximately to the angle $theta_s$; this angle $theta_s$ is not in fact the fully closed angular position for said auxiliary throttle valve 14, so as not excessively to restrict the rotation of the driven vehicle wheels 26 and 27. Thus, while the value of the flag $F_s$ is unity, the auxiliary throttle valve 14 is closed to the angular position $theta_s$, thus restricting the air intake of the internal combustion engine 1 and reducing the output torque of said engine 1. Therefore, not only are the driven wheels 26 and 27 braked directly, but also the closing of the auxiliary throttle valve 14 reduces the torque on said driven wheels, thus making the acceleration slippage control faster, surer, and more effective. In FIG. 8, the dot dashed line $theta_1$ shows the opening amount of the main throttle valve 10.

Figure 11:
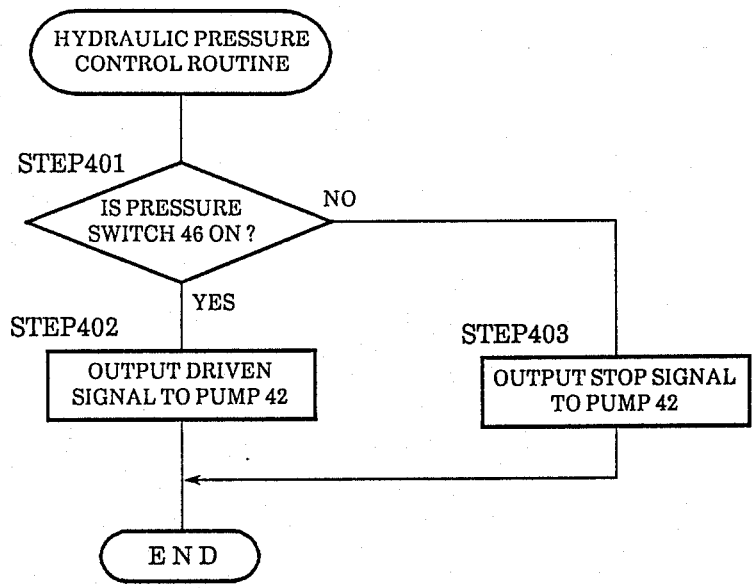
FIG. 11 is a flow chart showing the process of controlling the pressure value in a pressure accumulator for this control system.

In order to provide good operation of the brake system for the driven vehicle wheels 26 and 27, it is desirable to maintain the hydraulic fluid pressure in the accumulator 45 at an appropriate pressure level. In FIG. 11, there is shown the process, as performed by the CPU 61, of controlling said pressure in said accumulator 45, in order to support the braking performed as described above. The steps of the program fragment expressed by this flow chart will now be explained in detail; this program fragment again may be executed once every some fixed time interval, for example about once every twenty milliseconds.

First, in the decision step 401, a decision is made as to whether the output signal from the pressure switch 46 is indicative of a low level of hydraulic fluid pressure, i.e. indicates a pressure level less than some determinate pressure value, or not. If the answer to this decision is NO, so that the pressure switch 46 is not currently sensing a low hydraulic fluid pressure value, then it is deemed that the pressure level in the accumulator 45 is adequate, and then the flow of control passes next to the step 403. On the other hand, if the answer to this decision is YES, so that the pressure switch 46 is in fact currently sensing a low hydraulic fluid pressure value, then it is deemed that the pressure level in the accumulator 45 is not currently adequate, and in this case the flow of control passes next to the step 402.

In the step 402, the microcomputer 50 outputs a drive signal to the hydraulic fluid pressure pump 42, so as to increase the pressure level of the hydraulic fluid in the accumulator 45, and next the flow of control passes to leave this program fragment, without doing anything further. On the other hand, in the step 403, the microcomputer 50 outputs a stop signal to the hydraulic fluid pressure pump 42, so as no more to increase said pressure level of said hydraulic fluid in said accumulator 45; and again next the flow of control passes to leave this program fragment, without doing anything further. Thus, the step 402 is only performed when the pressure level of the hydraulic fluid in the accumulator 45 has dropped to below the aforementioned determinate pressure level because said hydraulic fluid pressure has been utilized for driving the auxiliary brake master cylinder 23 by being supplied to its pressure chamber 23a; otherwise, this step 402 is not performed.

Thus, to summarize the operation of this preferred embodiment of the drive wheel slippage control device of the present invention, when acceleration slippage occurs, the value of the flag $F_s$ changes from zero to unity, and the braking system for the driven wheels 26 and 27 of the vehicle is operated, and further the auxiliary throttle valve 14 is throttled down somewhat so as to reduce the engine torque. The pressure $P_{mu}$ with which said braking system for the driven wheels 26 and 27 is applied is set to depend upon a value derived for the coefficient of friction mu between said driven vehicle wheels 26 and 27 and the road surface; and likewise the time $T_{mu}$ for which said braking system for the driven wheels 26 and 27 is applied is set to depend upon said value derived for said road surface coefficient of friction mu. Therefore the problems outlined earlier with regard to the conventional art that, depending upon the actual value of mu, the braking effect may be too strong or too weak, and the time of application thereof may be too long or too short, are obviated. Thus, because the acceleration slippage control is optimized according to the current conditions of the road surface, it is possible to minimize control time and to minimize brake shoe or pad wear amount. In FIG. 8, a dot dot dot dashed line $V_r'$ shows the variation of the operation of a conventional acceleration slippage control system in the case of a road surface with low coefficient of friction mu; a dashed line $V_r''$ shows the variation of the operation of such a conventional acceleration slippage control system in the case of a road surface with high coefficient of friction mu; and in this case the vehicle acceleration is reduced as shown by the dashed line $V_f'$.

Thus, it is seen that according to the present invention the braking intensity or the time period of braking is set according to the condition of the road surface. Therefore, the braking force is made to depend upon the road surface condition, and stable braking control is obtained upon all types of road surface and in all operational conditions, and good anti acceleration slippage control is provided. That is, the amount of braking accorded to a slipping drive wheel for the vehicle is altered according to operational requirements, and vehicle road wheel slippage is controlled appropriately in all operational circumstances, without ever substantially over or under braking the rotation of the vehicle drive wheels, and without unduly affecting vehicle accelerability. And, according to this automotive vehicle drive wheel slippage control device, thus vehicle wheel slippage is always properly curbed. Further, this automotive vehicle drive wheel slippage control device is suitable for providing good vehicle operation on road surfaces of varying coefficients of friction, ranging from slippery roads covered with ice, snow, or water to dry roads.

In the shown preferred embodiment of the drive wheel slippage control device of the present invention, both the brake actuating pressure rise time (i.e. the braking pressure value) and the brake actuating pressure hold on time (i.e. the braking time) are arranged to depend upon the coefficient of friction between the driven vehicle wheels and the road surface; but this is not to be considered as limitative of the present invention. For example, the good effects of the present invention could be obtained, at least in part, by arranging that either one of these quantities was determined according to said road surface coefficient of friction, while keeping the other one of said quantities substantially constant. Further, although in the shown preferred embodiment the auxiliary throttle valve 14 was utilized for reducing the engine torque during acceleration slippage control, this is not essential to the present invention, and a similar effect may be obtained only with driven wheel braking being provided and no engine torque reduction being provided. Thus, although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. An automotive vehicle driven wheel slippage control device, comprising:
   (a) a means for determining the rotational speed of a driven wheel of said automotive vehicle;
   (b) a means for determining the presence of a condition of acceleration slippage by utilizing as a parameter the rotational speed of said driven wheel as determined by said determining means therefor;
   (c) a means for determining the value of a parameter representing the condition of the road surface on which said automotive vehicle is being operated;
   (d) a means for operating a braking device provided to said driven wheel; and:
   (e) a means for controlling said braking device operating means and for setting braking conditions for said driven vehicle wheel, when acceleration slippage is determined by said determining means therefore, said braking conditions being varied according to the current value of said parameter representing road surface condition.

2. An automotive vehicle driven wheel slippage control device according to claim 1, wherein during acceleration slippage said braking device operating means control means varies the intensity of braking provided by said braking device for said driven wheel according to the current value of said parameter representing road surface condition.

3. An automotive vehicle driven wheel slippage control device according to claim 1, wherein during acceleration slippage said braking device operating means control means varies the time duration of braking provided by said braking device for said driven wheel according to the current value of said parameter representing road surface condition.

4. An automotive vehicle driven wheel slippage control device according to claim 1, wherein during acceleration slippage said braking device operating means control means varies both the intensity and also the time duration of braking provided by said braking device for said driven wheel according to the current value of said parameter representing road surface condition.

5. An automotive vehicle driven wheel slippage control device according to claim 1, further comprising a means for throttling down the engine of said automotive vehicle during acceleration slippage.

6. An automotive vehicle driven wheel slippage control device according to claim 1, wherein said means for determining the value of said parameter representing the condition of the road surface on which said automotive vehicle is being operated does so by determining a value representing torque on said driven wheel and a value representing the rotational acceleration of said driven wheel, and by obtaining said parameter value therefrom.

7. An automotive vehicle driven wheel slippage control device according to claim 6, wherein said means for determining the value of said parameter representing the condition of the road surface on which said automotive vehicle is being operated does so by extracting said road surface condition parameter value from a table thereof indexed against said value representing torque on said driven wheel and said value representing the rotational acceleration of said driven wheel.

* * * * *